Nov. 4, 1969  K. O. CREEK ET AL  3,475,825
APPARATUS FOR CHECKING DISTORTION OF A REACTOR FUEL ELEMENT
Filed May 3, 1968  3 Sheets-Sheet 1
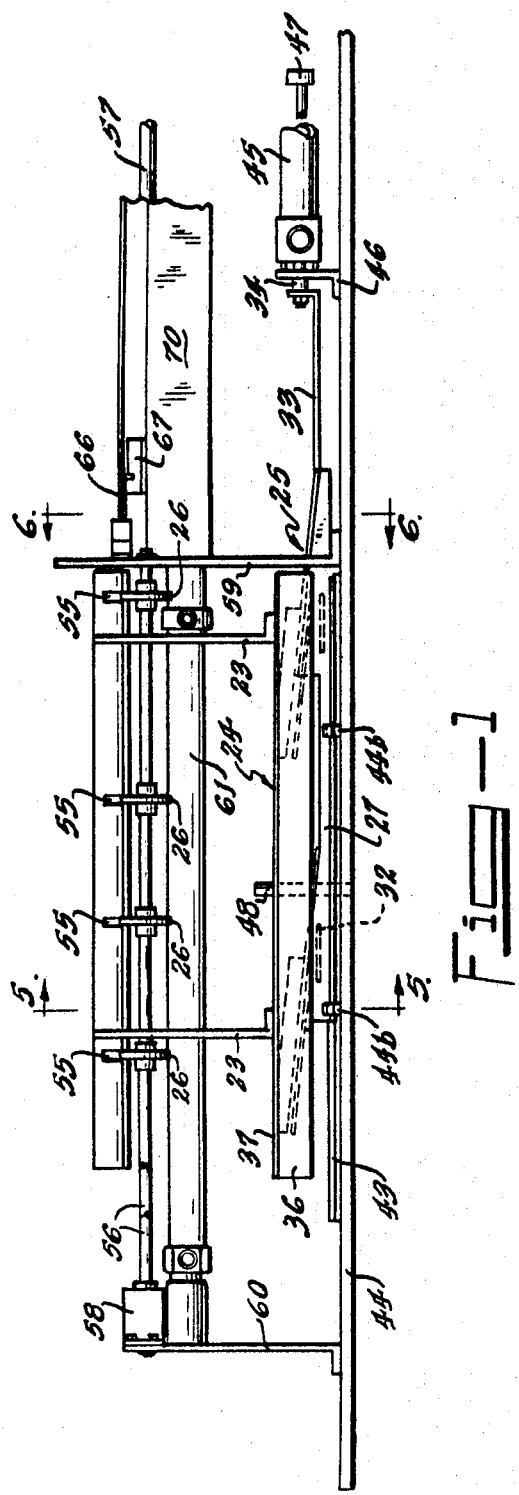
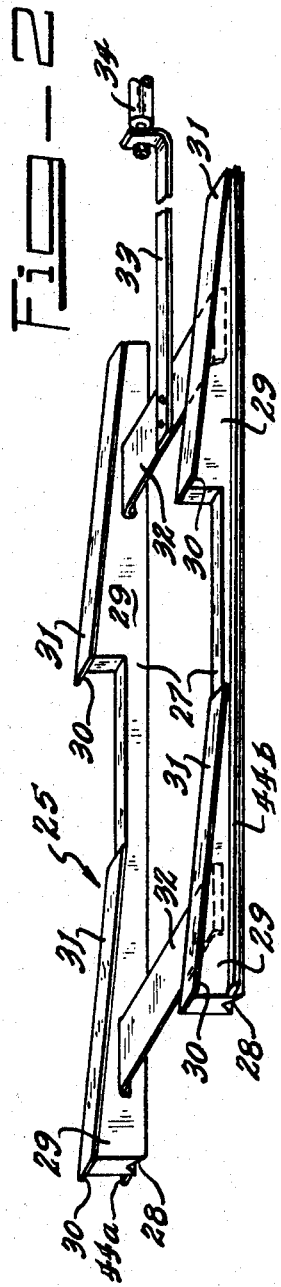
Inventors
Kenneth O. Creek
David W. Leiby
Roland A. Anderson
Attorney

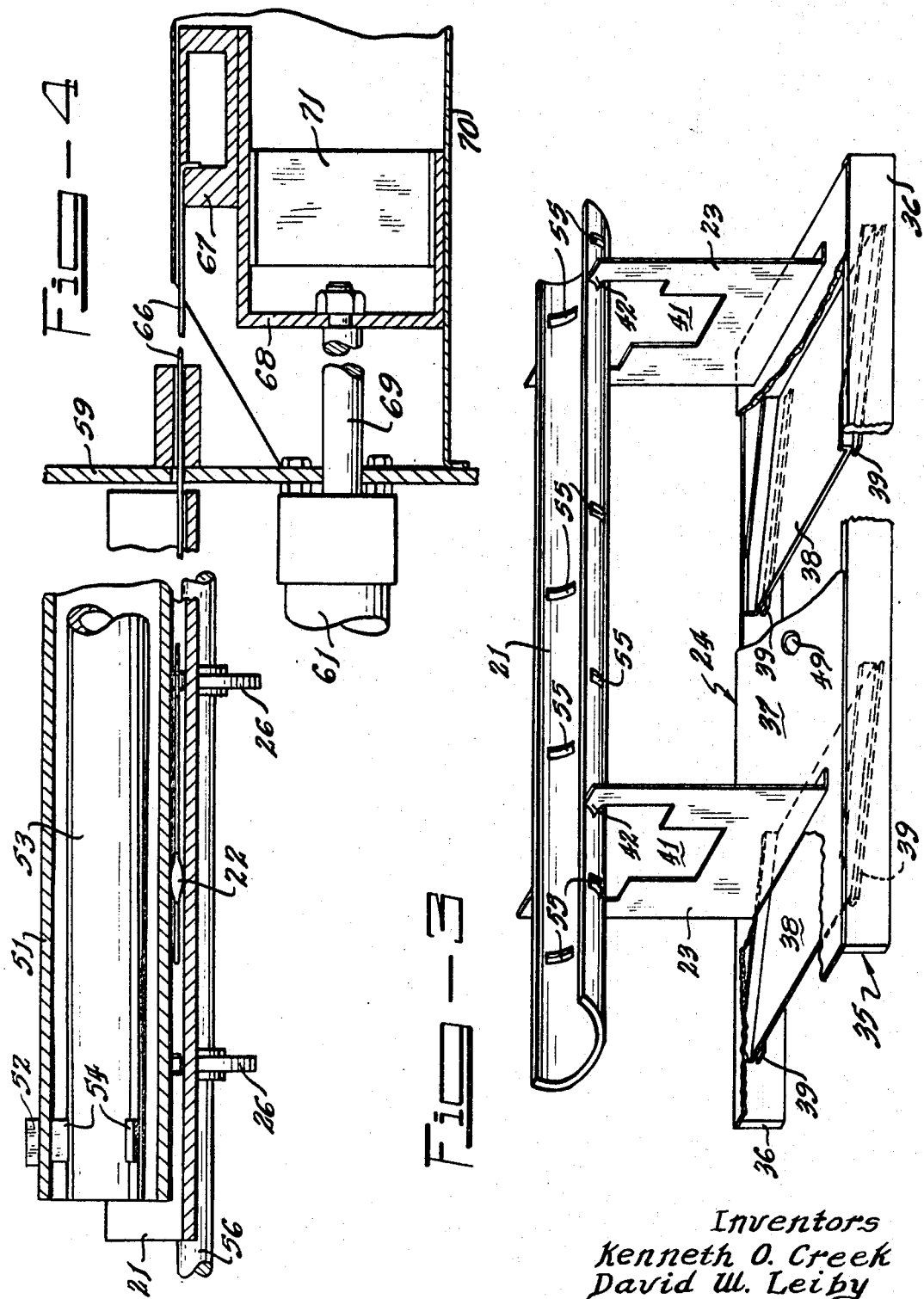

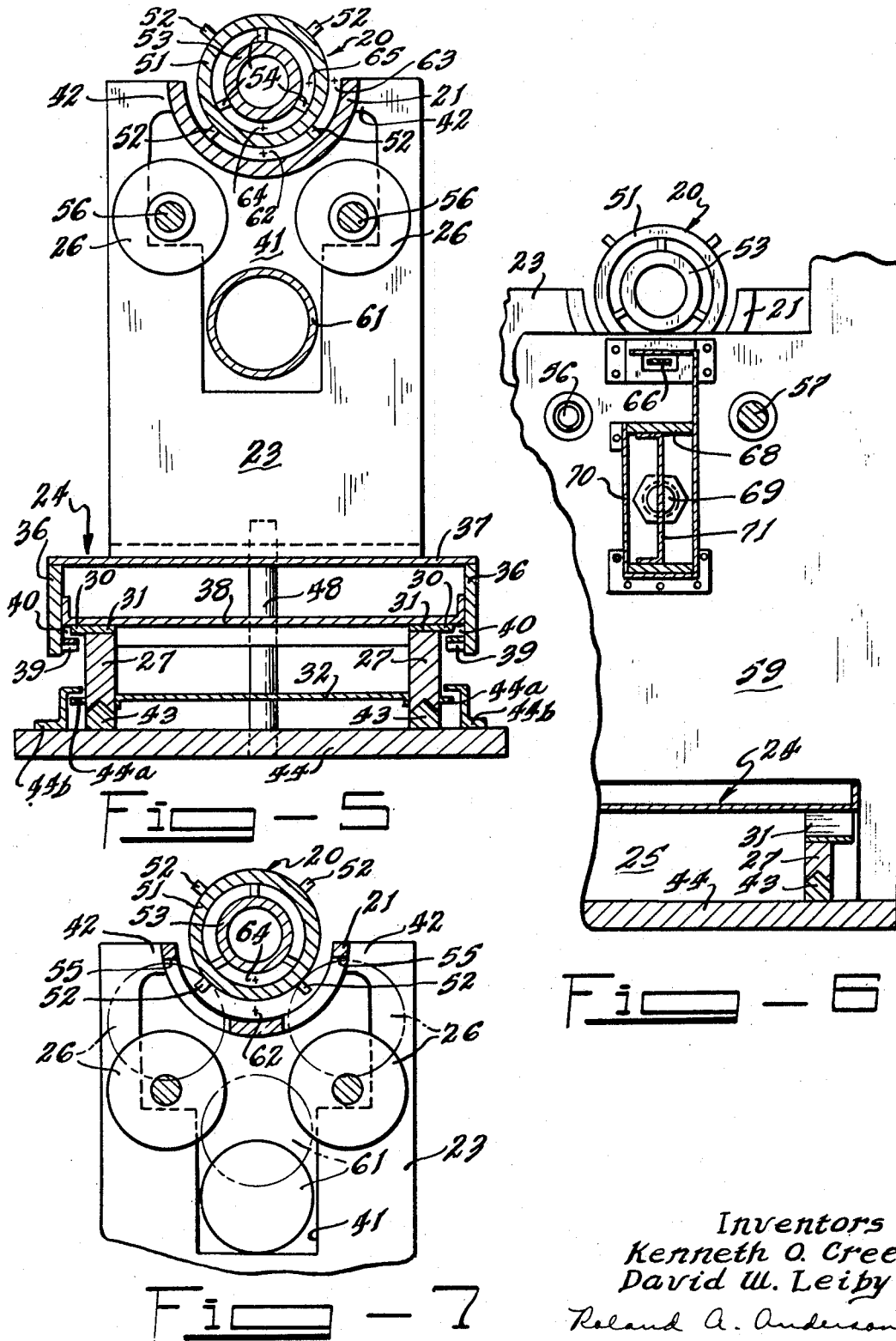

United States Patent Office 3,475,825
Patented Nov. 4, 1969

3,475,825
APPARATUS FOR CHECKING DISTORTION OF A REACTOR FUEL ELEMENT
Kenneth O. Creek, Richland, Wash., and David W. Leiby, Cincinnati, Ohio, assignors to the United States of America as represented by the United States Atomic Energy Commission
Filed May 3, 1968, Ser. No. 726,301
Int. Cl. G01b 5/30
U.S. Cl. 33—174                                   4 Claims

ABSTRACT OF THE DISCLOSURE

Apparatus for checking distortion of a compound reactor-fuel element by probing the space between inner and outer sections of the fuel element and the exterior of the outer section. The fuel element is placed in a semicylindrical shell simulating the reactor tube in which the fuel element has lately been operating, and is made to occupy several positions with respect to the shell during the course of the probing.

Contractual origin of the invention

The invention described herein was made in the course of, or under, a contract with the United States Atomic Energy Commission.

Background of the invention

This invention relates to a probe for a long slender element such as a reactor-fuel element. More specifically, the invention relates to an apparatus for probing the interior and exterior of a compound reactor-fuel element.

Operation of a nuclear reactor causes the fuel elements therein to bow, warp, and swell. It is most desirable to learn the extent of such distortions, for they can unduly restrict the flow of coolant over the fuel elements and thus force the reactor to be shut down.

Summary of the invention

According to the present invention, a fuel element is removed from a reactor after use therein and is placed in a semicylindrical shell simulating the reactor tube. The fuel element is probed along various external regions and internal regions. The shell carrying the fuel element is vertically adjusted with respect to wheels that penetrate the shell and engage and shift the fuel element about its axis. Thus, probing of various regions of the fuel element peripherally spaced from one another can be carried out, and a more complete idea can be obtained of the distortion of the fuel element.

Brief description of the drawings

FIG. 1 is a side view of the apparatus of the present invention;
FIG. 2 is a perspective view of a slide, forming an important part of the present apparatus;
FIG. 3 is a perspective view, with parts broken away, of a shell and an adjustable platform, forming other important parts of the apparatus;
FIG. 4 is a fragmentary sectional view showing the probe and associated parts of the present apparatus;
FIG. 5 is a sectional view taken on the line 5—5 of FIG. 1;
FIG. 6 is a sectional view taken on the line 6—6 of FIG. 1; and
FIG. 7 is a fragmentary view similar to FIG. 5, showing certain parts of the present apparatus in various positions.

Description of the preferred embodiment

As shown in FIGS. 4 and 5, the apparatus of the present invention is intended to check the condition of a compound fuel element 20 and includes a holder 21 in which the fuel element rests, and a probe 22 adapted to be moved along the interior and exterior of the fuel element. The holder 21 and the fuel element 20 therein are adjusted laterally up or down for purposes to be described presently by means of brackets 23 and a platform 24 shown in FIG. 3 and a slide 25 shown in FIG. 2. When the platform 24 and slide 25 are assembled in a manner to be described presently, movement of the slide 25 to the right as viewed in FIG. 2 produces upward adjustment of the platform 24, brackets 23, and holder 21, and movement of the slide to the left, downward adjustment of the platform, brackets, and holder. Upon adjustment of the holder 21, driving wheels 26, which are shown in FIGS. 1, 5, and 7, project through the holder 21 into engagement with the fuel element 20, enabling it to be moved angularly about its own axis so that the probe 22 may examine regions of the fuel element spaced peripherally from one another.

As shown in FIG. 2, the slide 25 comprises a pair of long spaced parallel members 27, each having along its lower side a longitudinal V-shaped groove 28, and at the opposite upper side a pair of wedge portions 29 spaced from one another lengthwise of the member. The wedge portions 29 of each member 27 have flanges 30 extending outwardly or away from the other member 27 and are formed by strips 31 attached to the wedge portions 29. The members 27 are secured in spaced relation to one another by a pair of tie pieces 32 which have their ends attached to the members 27 adjacent the wedge portions 29 and extend transversely of and between the members 27. A tongue 33 has one end attached to an intermediate region of one of the tie pieces 32 and the other end connected to a piston rod 34 to which power is applied to move the slide 25, as will be more disclosed presently.

As shown in FIG. 3, the platform 24 comprises a shallow inverted channel 35 having sides 36 and a base 37, a pair of plates 38 attached to and extending between the sides 36 of the channel in somewhat inclined relation to the base 37, and four ribs 39 secured to the inner sides 36 of the channel 35 in spaced parallel relation to the plates 38, so as to form therewith, as shown in FIG. 5, grooves 40 which loosely receive the flanges 30 of the slide 25, as will be described presently. The plates 38 are spaced from one another longitudinally of the platform 24, much as are the wedge portions 29 of each long member 27 of the slide 25. The base 37 of the channel 35 is formed of a relatively thin sheet, and the sides 36 are formed of relatively thick strips attached to the sheet.

As shown in FIG. 3, the brackets 23 are spaced from one another along the fuel-element holder 21 and extend transversely thereof. Each bracket 23 has its lower end secured to the exterior of the base 37 of the channel 35. The upper portion of each bracket 23 is recessed as indicated at 41 so as to have portions 42, which, as shown in FIG. 5, are opposed and are secured as by welding to opposite sides of the holder 21.

As shown in FIGS. 1 and 5, the slide 25 moves along rails 43 secured to a base plate 44. The rails 43 are V-shaped in cross section at their upper sides which mate with the V-shaped grooves 28 in the long members 27 of the slide 25. As shown in FIGS. 2 and 5, a pair of strips 44a are secured to the outer sides of the long members 27 adjacent the grooves 28 and extend for the length of the long members 27. As shown in FIGS. 1 and 5, four Z-members 44b are secured by their bases to the base plate 44 outside of the rails 43 and have their tops extending over the strips 44a. An hydraulic cylinder 45 has one end secured by a bracket 46 to the base plate 44. A piston 47 slidable within the cylinder 45 is attached to one end of the piston rod 34. The other end thereof protrudes from the cylinder and is connected to the tongue 33 of the slide 25, as previously described. The piston 47 is shifted along the cylinder 45 by water under pressure applied to the ends of the cylinder and acts through the piston rod 34 and the tongue 33 to move the slide 25. The platform 24 is held against horizontal movement, while being permitted to have vertical movement or adjustment, by a pin 48 which is secured in the base plate 44 and projects upwardly therefrom through an opening 49 in the base 37 of the channel 35.

The platform 24 is mounted on the slide 25 through support of the plates 38 of the platform on the wedge portions 29 of the slide, the plates 38 actually engaging the strips 31 applied to the wedge portions. Because the plates 38 are inclined and are supported on the wedge portions 29, and the pin 48 holds the platform 24 against horizontal movement, horizontal movement of the slide to the right or to the left as viewed in FIG. 2 adjusts the platform 24 up or down.

The present apparatus is prevented from tipping over by the ribs 39 on platform 24, flanges 30 and strips 44a on slide 25, and Z-members 44b on base plate 44. Tilting of the platform 24 with respect to the slide 25 is prevented by engagement of the ribs 39 with the flanges 30. Tilting of the slide 25 with respect to the base plate 44 is prevented by engagement of the strips 44a with the Z-members 44b.

As shown in FIGS. 3 and 5, the fuel-element holder 21 is in the form of half of a circular cylinder having an inner circular semicylindrical surface 50, which has the same radius as the interior of the reactor process tube (not shown) from which the fuel element 20 being checked by the present apparatus has been removed. The fuel element 20 is composed of an outer annular section 51, outer longitudinal ribs 52 thereon, an inner section 53 which may be annular as shown, and inner longitudinal ribs 54 separating the sections 51 and 53. The diameter of the fuel element 20 as measured across the outer ribs 52 is about equal to the diameter of the inner surface 50 of the holder 21, so that the fuel element 20 is approximately concentric with the surface 50.

As shown in FIG. 3, the holder 21 has a plurality of pairs of slots 55, the pairs being spaced from one another axially of the holder. Each slot 55 extends peripherally and is peripherally aligned and peripherally spaced from the associated slot 55 of the same pair. If for convenience we term the slots 55 of each pair as first and second slots, then all the first slots may be considered to be aligned axially of the holder in that corresponding ends of the slots are so aligned. The same thing is true of all the second slots.

The slots 55 are adapted to receive the driving wheels 26, which are equal in number to the slots and, as shown in FIGS. 1 and 5, are mounted on a pair of spaced parallel shafts 56 so as to be driven thereby. The shaft 56 that is away from the observer as viewed in FIG. 1 is driven by a power shaft 57 through a universal joint (not shown) and acts through three spur gears (not shown) lying within a bracket 58 to drive the shaft 56 that is toward the observer. The shafts 56 are supported at one end on a bracket 59 secured to the base plate 44, and at the other end by the bracket 58 which is attached to a bracket 60 secured to the base plate 44. The brackets 59 and 60 also carry an hydraulic cylinder 61 which cooperates with a piston (not shown) contained therein to move the probe 22 along the fuel element 20 and the holder 21. The cylinder 61 and the shafts 56 extend freely through the recesses 41 in the brackets 23 so as not to interfere with vertical adjustment of the holder 21 and the brackets 23.

The outer ribs 52 do not extend for the entire length of the fuel element 20, but are formed in two sets, one near one end of the fuel element, the other near the other end, as shown in FIG. 4. The driving wheels 26 are so spaced along the shafts 56, that when the wheels penetrate the holder 21, they engage the outer fuel-element secton 51, instead of the outer ribs 52.

As shown in FIG. 2, it is intended that the probe 22 make four passes lengthwise of the fuel element 20 to measure the distance between the outer surface of the outer section 51 and the inner surface 50 of the holder 21 representing the interior of the process tube from which the fuel element 20 has been removed, and the distance between the inner and outer sections 53 and 51 of the fuel element. The purpose of these measurements is to determine the bow, warp, and swelling of the fuel element 20, the collapse of its supports, and the restriction to coolant-water flow through and past the fuel element. The location of these four passes of the probe 22 along the fuel element 20 is indicated by four points 62, 63, 64, and 65 in FIG. 2. One pass of the probe 22 is made between the holder 21 and the outer fuel-element section 51 along a line passing through the point 62 and perpendicular to the plane of FIG. 2. Another pass is made outside the section 51 along a line that passes through the point 63 perpendicularly to the plane of FIG. 2 and is displaced about 90° about the fuel element 20 from the line through point 63. A third pass is made between the fuel-element sections 51 and 53 along a line that passes through point 64 and is perpendicular to the plane of FIG. 2. A fourth pass is made between the sections 51 and 53 along a line that passes through point 65 perpendicularly to the plane of FIG. 2 and is displaced about the fuel element 20 about 90° from the line through point 64.

The adjustment of the probe 22 between the relative positions represented by points 62, 63, 64, and 65 is effected by vertical adjustment of the holder 21 and fuel element 20 with respect to the probe 22 and angular adjustment of the fuel element about its own axis with respect to the probe 22. Vertical adjustment of the holder 21 and fuel element 20 is brought about by vertical adjustment of the platform 24 produced by horizontal shifting of the slide 25. Angular shifting of the fuel element 20 is brought about by angular movement of the driving wheels 26 while in contact with the fuel element.

Let us assume that the present apparatus is in the position of FIG. 1, with the slide 25 moved to the right and the platform 24 elevated, so that the holder 21 is elevated. Accordingly the driving wheels 26, relatively speaking, are in the lowered full-line position of FIG. 7, though the level of the driving wheels 26 does not actually change. What does change is the relative level of the driving wheels with respect to the holder 21, which is represented in FIG. 7 as not changing in level, though actually the holder does change in level. The holder 21 being elevated, the fuel element 20 resting therein is elevated with respect to the probe 22, which is not adjusted vertically. Now the pass by the probe 22 along the line through the point 62 is made.

Now the probe 22 is withdrawn from the fuel element 20 and the holder 21, and the slide 25 is moved to the left as viewed in FIG. 1 to lower the platform 24. This lowers the fuel element 20 with respect to the probe 22, which, though actually stationary vertically, is in effect raised to the point 64 and now may make a pass along the line through the point 64.

The vertically stationary wheels 26 will in effect have been raised to the broken-line position of FIG. 7 to engage the fuel element 20. After the pass along the line through point 64 and withdrawal of the probe 22 from the space between the fuel-element sections 51 and 53, the wheels 26 are rotated to move the point 65 from the position of FIG. 2 down to the point 64. In effect, the probe 22 has been shifted to the point 65 and may now make a pass along a line through point 65.

After completion of this pass, the probe 22 is withdrawn from the space between the fuel-element sections 51 and 53. Now the fuel element 20 is raised by elevation of the holder 21, produced by upward adjustment of the platform 24, caused by rightward movement of the slide 25. The probe 22 is in effect brought to point 63 and now makes a pass along a line through point 63.

As shown in FIGS. 4 and 6, the probe 22 is connected to the piston (not shown) in the cylinder 61 by a wand 66, a wiring block 67 connected thereto, a bracket 68 attached thereto, and a piston rod 69 connected thereto and to the piston in the cylinder 61. The block 67 and bracket 68 are slidably mounted in a long box-like guide 70 attached to the bracket 59. The bracket 68 carries a vane 71 whose purpose is, on extreme movement to the right as viewed in FIG. 4, to actuate a switch (not shown) to stop rightward movement of the piston in the cylinder 61. Further details of the items introduced in this paragraph are not supplied, because per se they have nothing to do with the invention.

The same is true of the probe 22 and various electrical elements directly associated therewith. The probe 22 may be of the strain-gage type and be wired to a two-channel XY recorder, which will record the condition of the fuel element 20 at various positions along its length. Suitable interlocking of controls for the cylinder 45 actuating the slide 25, the cylinder 61 longitudinally adjusting the probe 22, and the drive of the shafts 56 carrying the driving wheels 26 is provided, so that the fuel element 20 and holder 21 cannot be adjusted vertically and the wheels 26 cannot be rotated while the probe is inserted in the fuel element 20, and the probe 22 cannot be inserted in the fuel element 20, unless the fuel element and its holder 21 are in fully raised or fully lowered positions. It is intended that the present apparatus be operated in about fifteen feet of water, because it is to be used to inspect fuel elements after a long operation in a reactor. For such use of the apparatus, a special viewer for the fuel element 20 and the probe 22 are required. Movement of the piston in the cylinder 61 and the piston 47 in the cylinder 45 by water is desirable, because for indefinite immersed operation water is ideal in comparison with an electric drive. Water drive is also preferable to a positive mechanical drive, because of the need to restrict the insertion force if the probe 22 strikes an obstruction in the fuel element 20.

It is also understood that the invention is not to be limited by the details given herein.

The embodiments of the invention in which an exclusive property or privilege is claimed are defined as follows:

1. Apparatus for checking distortion of a compound fuel element composed of inner and outer sections, internal longitudinal ribs radially spacing the sections, and external longitudinal ribs on the exterior of the outer section, by measuring the space between inner and outer sections of the fuel element and the location of the exterior of the outer section, said apparatus comprising:

a holder in the form of a shell having an inner circular semicylindrical surface adapted to be engaged by the external ribs of the fuel element so as to be approximately concentric therewith, the holder having a plurality of pairs of slots, the pairs being spaced from one another axially of the holder, each slot extending peripherally of the holder and being spaced peripherally of the holder from the other slot of the same pair, a probe adapted to be moved along the holder and the fuel element, a pair of parallel spaced shafts located on the ends of the holder away from the semicylindrical surface thereof and being parallel to the axis of said surface, a plurality of wheels mounted on the shafts so as to be driven thereby, the wheels being equal in number to the slots in the holder and spaced from one another axially of the shafts so as to be adapted to enter the slots, one to a slot, and engage the fuel element for shifting the same about its axis with respect to the holder and the probe, and means for moving the holder and the fuel element laterally with respect to the probe and the wheels between a first position in which the wheels enter the slots in the holder and engage the fuel element and the probe may enter the space between the inner and outer sections of the fuel element, and a second position in which the wheels are disengaged from the fuel element and withdrawn from the slots in the holder and the probe may enter the space between the holder and the outer section of the fuel element.

2. The apparatus as specified in claim 1, the means for moving the holder and fuel element laterally with respect to the probe and the wheels, comprising:
  (a) a pair of spaced parallel rails,
  (b) a slide comprising:
    (1) a pair of long members arranged in spaced parallel relation to one another and slidably mating with the rails, each member having at one side a pair of wedge portions spaced from one another lengthwise of the member, and
    (2) tie pieces located adjacent the wedge portions and securing the long members in spaced relation to one another,
  (c) a platform comprising:
    (1) a shallow channel, and
    (2) a pair of plates attached to and extending between the sides of the channel and being spaced from one another lengthwise of the channel, each plate being somewhat inclined to the base of the channel, one plate resting on one wedge portion of one long member and on one wedge portion of the other long member, the other plate resting on the other wedge portions of the long member,
  (d) a pair of brackets spaced lengthwise of the channel, each bracket being attached at one end to the exterior of the base of the channel and at the other end to the fuel-element holder,
  (e) power means connected with one of the tie pieces of the slide for moving the slide along the tracks, and
  (f) means preventing movement of the platform along the tracks while providing for transverse movement of the platform away from the tracks in response to movement of the slide along the tracks.

3. The apparatus as specified in claim 1, the means for moving the holder and fuel element laterally with respect to the probe and the wheels, comprising:
  (a) a pair of spaced parallel rails each having one side V-shaped in cross section,
  (b) a slide comprising:
    (1) a pair of long spaced parallel members each having at one side a V-shaped recess, the recess of one member mating with the V-shaped side of one rail, the recess of the other member mating with the V-shaped side of the other rail, each member having at the side opposite the recess a pair of wedge portions spaced from one another lengthwise of the member, the members having flanges one to a wedge portion, the flanges on each member projecting outwardly away from the other member, and
    (2) tie pieces located adjacent the wedge portions and securing the long members in spaced relation to one another,
  (c) a platform comprising:
    (1) a shallow channel and
    (2) a pair of plates attached to and extending between the sides of the channel and being spaced from one another lengthwise of the channel, each plate being somewhat inclined to the base of the channel, one plate resting on one wedge portion of one long member and on one wedge portion of the other long member, the other plate resting on the other wedge portions of the long members,
  (d) a pair of brackets spaced lengthwise of the channel, each bracket being attached at one end to the exterior of the base of the channel and at the other end to the fuel-element holder,
(e) power means connected with one of the tie pieces of the slide for moving the slide along the tracks, and
(f) means preventing movement of the platform along the tracks while providing for transverse movement of the platform away from the tracks in response to movement of the slide along the tracks.

4. The apparatus as specified in claim 1, the means for moving the holder and fuel element laterally with respect to the probe and the wheels, comprising:
(a) a base plate,
(b) a pair of spaced parallel rails secured on top of the base plate, each rail having its top side V-shaped in cross section,
(c) a slide comprising:
  (1) a pair of long spaced parallel members each having at one side a V-shaped groove, the groove of one member mating with the V-shaped side of one rail, the groove of the other member mating with the V-shaped side of the other rail, each member having at the side opposite the groove a pair of wedge portions spaced from one another lengthwise of the member, the members having flanges one to a wedge portion, the flanges on each member projecting outwardly away from the other member, and
  (2) tie pieces located adjacent the wedge portions and securing the long members in spaced relation to one another, and
  (3) a pair of strips secured to the long members, one strip to one member, the other strip to the other member, each strip extending along a side of the associated member away from the other member and being adjacent the groove of the associated member,
(d) four Z-members secured by their bases to the top of the base plate outside the rails and having their tops extending over the strips on the long members,
(e) a platform comprising:
  (1) a shallow channel,
  (2) a pair of plates attached to and extending between the sides of the channel and being spaced from one another lengthwise of the channel, each plate being somewhat inclined to the base of the channel, one plate resting on one wedge portion of one long member and on one wedge portion of the other long member, the other plate resting on the other wedge portions of the long members, and
  (3) four ribs attached to the inner sides of the channel adjacent and parallel to the plates so as to form with the plates four grooves receiving the flanges on the wedge portions of the long member,
(f) a pair of brackets spaced lengthwise of the channel, each bracket being attached at one end to the exterior of the base of the channel and at the other end to the fuel-element holder,
(g) power means connected with one of the tie pieces of the slide for moving the slide along the tracks, and
(h) means preventing movement of the platform along the tracks while providing for transverse movement of the platform away from the tracks in response to movement of the slide along the tracks.

References Cited
UNITED STATES PATENTS

| | | | |
|---|---|---|---|
| 2,470,404 | 5/1949 | Kloos | 33—174 |
| 3,163,305 | 12/1964 | Stanton | 33—174 |

SAMUEL S. MATTHEWS, Primary Examiner